US011725510B2

(12) United States Patent
Fawad et al.

(10) Patent No.: US 11,725,510 B2
(45) Date of Patent: Aug. 15, 2023

(54) FLUID IDENTIFICATION AND SATURATION ESTIMATION USING CSEM AND SEISMIC DATA

(71) Applicants: Manzar Fawad, Oslo (NO); Md Nazmul Haque Mondol, Oslo (NO)

(72) Inventors: Manzar Fawad, Oslo (NO); Md Nazmul Haque Mondol, Oslo (NO)

(*) Notice: Subject to any disclaimer, the term of this patent is extended or adjusted under 35 U.S.C. 154(b) by 0 days.

(21) Appl. No.: 17/247,746

(22) Filed: Dec. 22, 2020

(65) Prior Publication Data
US 2021/0207473 A1     Jul. 8, 2021

Related U.S. Application Data

(60) Provisional application No. 62/956,721, filed on Jan. 3, 2020.

(51) Int. Cl.
    *E21B 49/08*       (2006.01)
    *G01V 11/00*       (2006.01)

(52) U.S. Cl.
    CPC ........ *E21B 49/0875* (2020.05); *G01V 11/002* (2013.01); *G01V 11/007* (2013.01)

(58) Field of Classification Search
None
See application file for complete search history.

(56) References Cited

U.S. PATENT DOCUMENTS

| 8,064,287 B2* | 11/2011 | Harris | G01V 11/00 367/38 |
| 11,163,080 B2* | 11/2021 | Cobos | G01V 1/282 |

(Continued)

FOREIGN PATENT DOCUMENTS

| EP | 3570075 A1 * | 11/2019 | | G01V 1/282 |
| WO | WO-2008081162 A1 * | 7/2008 | | G01V 11/00 |

(Continued)

OTHER PUBLICATIONS

MacGregor, L., et al. "Integrated analysis of CSEM, seismic and well log data for prospect appraisal: a case study from West Africa." first break 30.4 (Year: 2012).*

*Primary Examiner* — Lina Cordero
(74) *Attorney, Agent, or Firm* — Ingenium Patents LLC; Peter R. Kramer

(57) ABSTRACT

A method for fluid identification and saturation estimation in subsurface rock formations using the Controlled Source Electromagnetic (CSEM) data and Seismic Data by calculating the fluid saturation ($S_{fl}$) in a reservoir given the resistivity obtained from CSEM data, and acoustic impedance obtained from the seismic data, comprising the following steps: a) obtaining wireline data within a zone of interest in a nearby well and determining the resistivity of water by calibrating the background resistivity trend with a reference $S_{fl}$ curve, b) obtaining inverted CSEM survey data from a subsurface zone of interest, c) obtaining inverted seismic data in the form of Acoustic Impedance (AI), d) bringing both the inverted CSEM and acoustic impedance data to a same domain; time or depth, f) calculating fluid saturation using a rock physics model inputting the resistivity of water along with inverted CSEM and acoustic impedance data, resulting in a $S_{fl}$ profile.

10 Claims, 7 Drawing Sheets

(56) References Cited

U.S. PATENT DOCUMENTS

| | | | | |
|---|---|---|---|---|
| 2008/0059075 A1* | 3/2008 | Colombo | ............... | G01V 11/00 |
| | | | | 702/18 |
| 2009/0204327 A1* | 8/2009 | Lu | ............................ | G01V 3/12 |
| | | | | 702/7 |
| 2009/0306899 A1* | 12/2009 | Harris | ..................... | G01V 3/083 |
| | | | | 702/14 |
| 2014/0058677 A1* | 2/2014 | Combee | ................. | G01V 3/083 |
| | | | | 702/7 |
| 2019/0353813 A1* | 11/2019 | Cobos | ..................... | G01V 1/306 |

FOREIGN PATENT DOCUMENTS

| | | | | |
|---|---|---|---|---|
| WO | WO-2012173718 A1 * | 12/2012 | .............. | G01V 1/282 |
| WO | WO-2014000758 A1 * | 1/2014 | ............... | G01V 3/08 |

\* cited by examiner

FLUID IDENTIFICATION AND SATURATION ESTIMATION USING CSEM AND SEISMIC DATA

The present invention relates generally to the field of exploration geophysics, and more particularly to identification and characterisation of potential hydrocarbon (oil, gas, and natural gas liquids) or CO2 storage reservoirs in onshore and offshore sedimentary basins, using combined seismic and electromagnetic geophysical data acquired onshore or offshore. The invention also relates to subsurface formation interval sonic velocity, bulk density, and electrical resistivity measured from borehole logs in a well as means to calibrate the seismic and electromagnetic geophysical data.

BACKGROUND FOR THE INVENTION

The acquisition and inversion of electromagnetic data has in recent years become a valuable tool in investigating potential hydrocarbon-bearing formations. Controlled-source electromagnetic (CSEM) data is often combined with other measurement data, such as seismic, gravity, magnetotelluric (MT) survey or nearby well-logs to mention a few. In most CSEM surveying acquisitions, a CSEM system comprises an electromagnetic emitter or antenna, that is either pulled from a vessel, stationary in the body of water or on the seabed, and likewise a number of electromagnetic receivers that are fixed on the seabed or towed from a vessel or stationary in the body of water. The receivers record variations in electrical resistance depending on variations in source signal, offset between the source and receiver and the geological properties of rock layers, including their inherent electrical resistivity properties. For instance, a hydrocarbon-bearing layer will exhibit a higher electrical resistance compared to the seawater or overburden of sediment or rock. The CSEM Inversion techniques have been developed to optimise the parameters of a model to find the best fit between the calculated value and the measured data while constraining the model employing the measured data.

Seismic surveys, when used in combination with other available geophysical, borehole, and geological data, provide useful information about the structure and distribution of subsurface rock properties and their interstitial fluids. Oil companies employ interpretation of such seismic data for selecting the sites to drill oil and gas exploratory and development wells. The seismic surveys while providing maps of geological structures also yield useful information for rock typing, fluid identification and quantification.

When borehole logs are available from nearby wells, seismic survey and CSEM data can be enhanced and calibrated by combining it with the log data. Compared to the CSEM resistivity, the log resistivity that is measured is usually assumed to be the horizontal component, primarily due to the design of the borehole tool. On the other hand, the log sonic transit time that is measured in a well is usually assumed to be the vertical component, again due to the design of the borehole tool.

Prior art modelling methods are based on applying resistance directly from CSEM inversion results, and inserting these into an appropriate saturation-resistivity relation, such as Archie's equation (Archie 1942) or similar. Data inversion provides an estimate of physical properties by way of updating an initial model based upon available measured data and other prior information from a given area. In brief, Archie's equation is an empirical quantitative relationship between porosity, electrical resistivity, and brine saturation of rocks. The equation is a basis for modern well-log interpretation as it relates borehole electrical resistivity measurements to hydrocarbon saturations. There are various forms of Archie's equation, such as the following general form:

$$S_w = \sqrt[n]{\frac{aR_w}{\phi^m R_t'}}$$

where, $S_w$ is water saturation, $\phi$ is porosity, $R_w$ is formation water resistivity, $R_t$ is acquired total resistivity, 'a' is tortuosity constant (usually about 0.6 for sandstone), 60 m is cementation factor (usually about 2), and n is saturation exponent (usually about 2).

Using porosity derived from the Wyllie's equation applied on the seismic-derived velocity, total resistivity from the CSEM and assuming the water resistivity 65 (and exponents in Archie's equation) are known, the fluid saturation ($S_{fl}$) estimate can be obtained from the expression: $S_{fl}=1-S_w$. This workflow assumes in principle that resistivity, porosity and saturation are constant within the CSEM resolution.

A common property between the CSEM and seismic data is porosity, which is often used to derive electrical resistivity/seismic velocity relations for shales and reservoir sandstones. A simplistic example that combines Archie's law with the seismic velocity (Carcione et al. 2007):

$$\frac{1}{R_t} = \frac{1}{R_f}\left(\frac{\frac{V_{ma}}{V}-1}{\frac{V_{ma}}{V_f}-1}\right)^m,$$

where $R_f$ is fluid resistivity, V is seismic derived compressional velocity, $V_{ma}$ is sound velocity of matrix and $V_f$ is velocity of fluid present within the pores of reservoir. This equation, however, handles only one fluid at a time, that could be either water or hydrocarbon/$CO_2$.

One may use different mixtures theories to obtain the electromagnetic and seismic properties, and then combine these theories in different ways. For instance, Archie's law or the complex refraction-index method CRIM model combined with the time-average equation are two possible choices. Other techniques involve relating the Gassmann equation with the different electromagnetic related equations. Further possibilities involve the HS bounds and the self-similar equation. In the case of plane-layered composites, Backus averaging to relate the conductivity and stiffness tensors can be considered, where the common property is the material proportion (Carcione et al. 2007).

Regarding the patents, a U.S. Pat. No. 8,064,287B2 published on 22 Nov. 2011 related to a method for mapping a property of a subsurface reservoir includes determining a value of at least one reservoir property from a relevant well and relating at least one property of the reservoir with one seismic attribute and one electromagnetic survey attribute at other geodetic position from the determined relationship. Whereas PCT WO2014000758A1 published on 3 Jan. 2014 related a method for estimating saturation using mCSEM data and stochastic petrophysical models by quantifying the average water saturation in a reservoir given the transverse resistance (TR) obtained from CSEM data. Both the methods, however, used indirect ways to solve for the fluid saturation.

U.S. Patent Application US20090306899A1 published on 10 Dec. 2009 was a joint processing method of seismic and controlled source electromagnetic (CSEM) surface data. The joint processing was performed by using a common rock physics model which related reservoir properties (such as porosity, lithology, saturation, and shaliness) to surface seismic AVO (or AVA) data. The electrical conductivity in the procedure was modeled by using Simandoux equation that uses porosity to relate the electrical conductivity with the seismic output.

U.S. Patent Application US20080059075A1 published on 6 Mar. 2008 documented a joint inversion method for generating velocity models for pre-stack depth migration ("PSDM"). This method, however, did not demonstrate methods of calculating properties including fluid saturation.

U.S. Patent Application US20090204327A1 published on 13 Aug. 2009 describes method for efficient inversion of controlled-source electro magnetic survey data to obtain a resistivity model of the subsurface of the survey area. The method extracts the dimensions and location of sub-surface structures as they may be revealed by existing seismic or other available high resolution survey data from the subsurface area. This method, however, did not include property like fluid saturation computations.

U.S. Patent Application US20140058677A1 published on 27 Feb. 2014 disclosed a method that included performing a first controlled source electromagnetic survey at a selected area that includes a reservoir zone; performing additional controlled source electromagnetic surveys at the selected area after the first survey; and inverting measurements from the first survey and the additional surveys to identify at least one resistivity change in the reservoir zone after the first survey, wherein during the inversion, respective measured resistivity values from the first survey and respective measured resistivity values from the additional surveys are constrained to be constant, and correspond to one or more areas disposed in the selected area that are outside of the reservoir zone. This method, however, did not show methods of calculating properties such as fluid saturation.

U.S. Patent Application WO2012173718A1 published on 20 Dec. 2012 presented a method for estimating subsurface geological properties (including fluid saturation) using multiple type of geophysical data. The inversion process approaches the true model at longer wavelengths first before solving for model parameters expected to vary at short wavelengths. This was achieved by "freezing" various data and model domains of the inversion problem. "Freezing" was defined as fixing, damping, downweighting, or removing particular parts of the objective function pertaining to data or model parameters that might contribute to poor convergence properties during an inversion.

In consideration of the prior art, there had been a need to directly relate acoustic impedance with the resistivity with an ability to calibrate locally, in consideration of the rock matrix and in-situ conditions using bore-hole data.

BRIEF SUMMARY

Therefore, it is a main objective of the present invention to provide a better and innovative method for the estimation of saturation in subsurface rock formations using controlled-source electromagnetic (CSEM) data and acoustic impedance inverted from seismic. The above-mentioned shortcomings associated with the prior art are addressed by way of the following novel improvements.

1) Coming up with a new rock physics model that relates formation resistivity ($R_t$) with acoustic impedance (AI), by-passing the use of porosity that is typically used to establish the relationship between these properties.

2) Circumvent the use of Gassmann equation to relate with the different electromagnetic constitutive equations. The Gassmann equation is useful; however, it requires the input variables at moduli level instead of directly using the sonic velocities.

3) An essential part of this method is that the model can be calibrated using the nearest well penetrated in the zone of interest. The calibration yields the resistivity of water as manifestation of the background resistivity trend. That saves the effort finding resistivity of water from other petrophysical or laboratory methods.

These upper mentioned benefits are aimed at addressing the deficiencies in the prior art. The improved method is disclosed according to the appended independent claim. Advantageous further developments are subject of the dependent claims.

A first aspect of the present invention relates to a method for the estimation of fluid saturation in a reservoir comprising the following steps:

a) obtaining interval travel time (Dt), bulk density (RHOB) and deep resistivity data from the nearest well within the zone of interest. Converting the relevant data to acoustic impedance, plotting it onto the AI-Resistivity ratio function plane to obtain 180 the resistivity of water $R_w$ while calibrating the model in terms of the resistivity background.

b) obtaining inverted CSEM survey data from the area of interest, c) obtaining inverted seismic data in the form of acoustic impedance (AI), d) calculating the fluid saturation ($S_{fl}$) using a novel equation inputting the AI from inverted seismic data, resistivity from the inverted CSEM survey data and $R_w$ obtained in step (a).

BRIEF DESCRIPTION OF THE DRAWINGS

Other features and advantages of the invention will be better understood from the following detailed description and the attached drawings in which.

DETAILED EXAMPLE

The method of the invention comprises the use of data acquired by CSEM, seismic, calibrated by well-logging tools making it possible to separate the influence of fluids other than in-situ saline water and, thus, to estimate the fluid saturation within sedimentary rocks. Subsurface reservoirs may generally consist of two components: (1) the rock matrix, and (2) the fluid(s) within the pore space (water, oil/gas or CO2).

Figure 1:
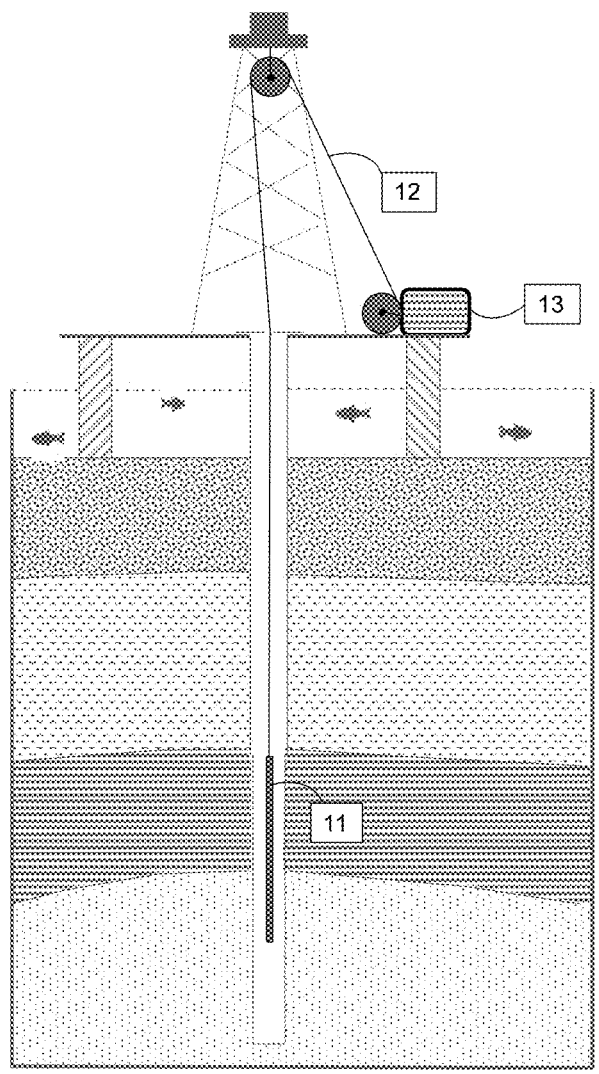
FIG. 1 illustrates typical wireline log data acquisition for subsurface sonic interval time, rock bulk density and resistivity determination.

Data obtained from the wellbore may include so-called "well log" data. Such data are typically recorded and presented against depth in the subsurface of various physical parameters measured by probes lowered into the wellbore. Such probes may include, for example, electrical resistivity, acoustic interval time, bulk density, neutron slowing down length, neutron capture cross-section, natural gamma radiation, and nuclear magnetic resonance relaxation time distribution, among others. The well logging procedure comprises recording of magnitudes of various above mentioned physical properties within a bore-hole using an array of logging probes (FIG. 1, 11), attached with a logging cable (12) connected on the other end to a data recording cabin (13).

Figure 2:
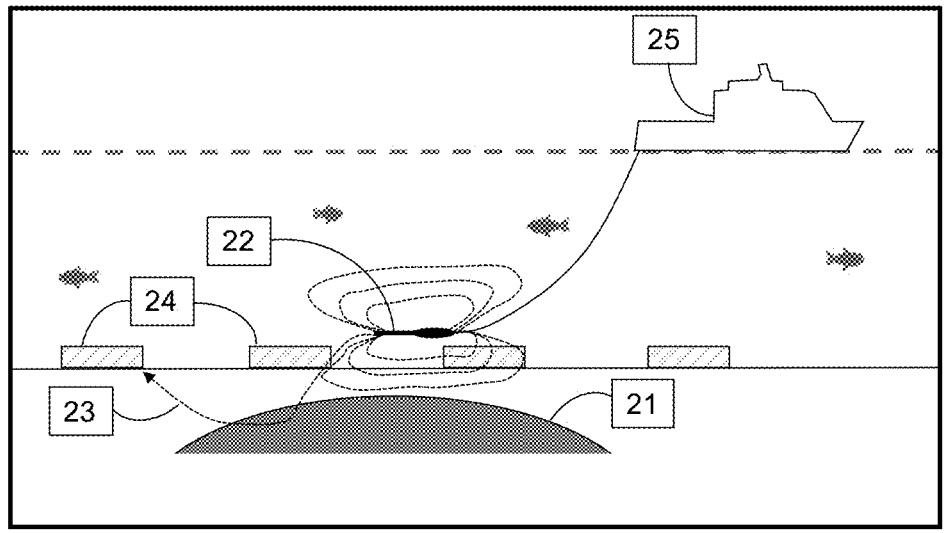
FIG. 2 shows an example of typical CSEM acquisition in a marine set up in this case.

The controlled-source electromagnetic (CSEM) methods had been used in hydrocarbon exploration since early in the 20th century. Recent advances in the technique make it possible to remotely measure the total horizontal and vertical electrical resistivity of subsurface formations with considerable accuracy but with moderate vertical resolution. CSEM surveying has become an essential geophysical tool for evaluating the presence of hydrocarbon-bearing reservoirs within the subsurface formations. In this method a controlled electromagnetic transmitter is towed above or positioned between electromagnetic receivers on the seafloor. FIG. 2 illustrates the controlled-source electromagnetic data acquisition method in a body of water above a potential hydrocarbon accumulation (21). The vessel is shown towing an electromagnetic source such as a horizontal electrical dipole (22). Receivers (24) are placed on the seafloor. The source emits a low-frequency current signal that penetrates below the water bottom as indicated in the drawing, A signal path (23) is shown traversing a hydrocarbon-bearing layer (21), which will be characterised by high electrical resistivity, and then being detected by the receivers. Data from receivers may be transmitted using telemetry devices (not shown separately) to the ship (25) that is recorded and processed.

Figure 3:
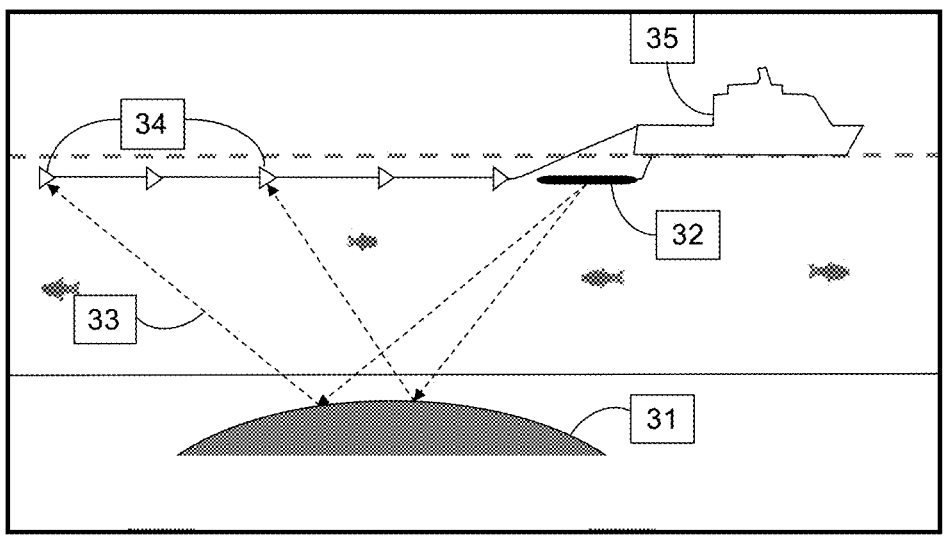
FIG. 3 is an illustration for seismic data acquisition in a marine set up in this case.

Seismic data acquisition is routinely performed both on land and at sea. At sea, seismic vessels deploy one or more cables ("streamers") behind the vessel as the vessel moves forward. Each streamer includes multiple receivers in a configuration generally as shown in FIG. 3. Streamer (34) trails behind a vessel (35), which moves forward as the survey progresses. As shown in FIG. 3, source (32) is also towed behind vessel (35). Source (32) and receivers (34) typically deploy below the surface of the ocean. Data is transmitted to the ship (35) through the cables that is recorded and processed. Source (32) emits seismic waves which reflect from boundaries (such as, e.g., formation boundary 31). The reflected waves are detected by receivers (34) and recorded as a function of time by determining the time it takes for seismic waves to propagate from source, reflected at a boundary (31) and back to receivers (34). The recorded signal may yield the information of the position, topography of boundary (31), rock, and in-situ fluid properties. The receivers used in marine seismology are commonly referred to as hydrophones, or marine pressure phones. Inversion of seismic data, depending on the procedure, may yield acoustic impedance, shear impedance, P-wave velocity, S-wave velocity, P- to S-wave ratio, and bulk density.

Figure 6:
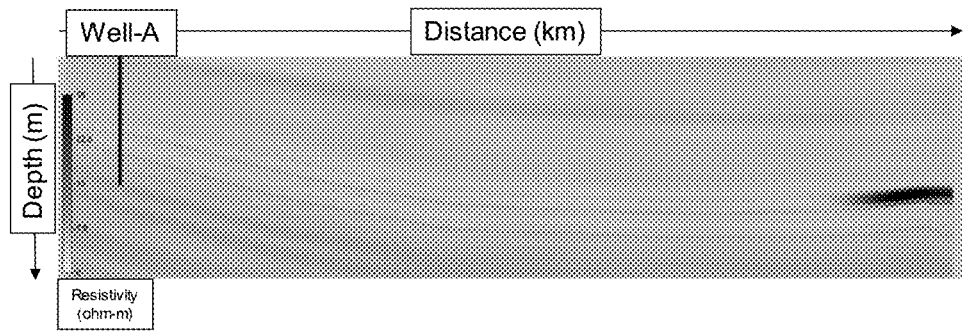
FIG. 6 is a resistivity profile in depth plotted against spatial distance, inverted from the CSEM data. The darker the grey shade, higher is the resistivity.
Figure 7:
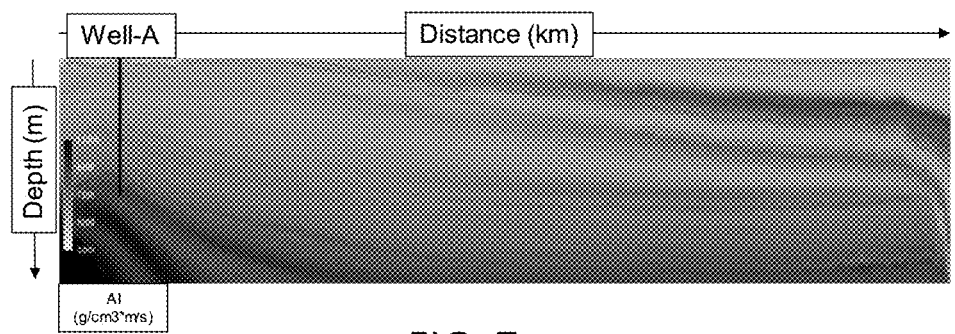
FIG. 7 is an Acoustic impedance (AI) profile inverted from the seismic data. The profile is in depth plotted against spatial distance. The darker the grey shade, higher is AI.

One embodiment of a method according to the invention will be explained with reference to the flow chart in FIG. 10. The method of the invention makes use, in some embodiments, of data acquired from at least one wellbore (Well A in this case, FIGS. 6, 7&8) drilled through subsurface rock formations in an area of interest. The method of the invention contains first of all the $R_w$ calibration of model using three well-logging probes data appropriate for predicting the magnitude of pore fluid. The response of well-logging tools is dependent on the properties related to the components as well as their respective percentage in the rocks investigated. The tool measuring the sonic transit time through the formations is sensitive to the rock porosity and the fluids it contains. We converted the sonic interval time to sonic velocity (115). The probe measuring the density is sensitive to water, other fluids and the void spaces/porosity between the matrix grains. The tool that measures the electric resistivity of the rock makes slight discrimination between the wet clay and the saline water as both are conducting agents, and no discrimination for variations in composition of the matrix if the conducting minerals are not in a continuous phase. The resistivity tool, however, records high resistivity values in case of hydrocarbon, freshwater or CO2 contained in the pore spaces. The product of density with sonic derived velocity is called acoustic impedance. We used acoustic impedance values as a combined augmented response of the sonic and density probes within the method of invention (116). Acoustic impedance is a standard outcome of inversion of seismic data, whereas resistivity (vertical and horizontal) is obtained from CSEM, both the procedures yield independent measurements within a wide areal extent. A function namely resistivity ratio function ($\sqrt{R_w/R_t}$) was introduced within the method of invention. The resistivity ratio function was defined as the square root of the ratio between the resistivity of formation water and the resistivity measured by the resistivity tool (117).

In a salt water-wet porous rocks, the two curves i.e. acoustic impedance and resistivity ratio respond to porosity. But in case of rock pores filled with hydrocarbon, freshwater or CO2 both the acoustic impedance and resistivity measurements respond due to two main effects: 1) the acoustic impedance responds to the presence of low-density low-velocity fluids, and 2) the resistivity ratio measurements respond to the porosity and the resistive fluids (gas/oil, freshwater, CO2). In a rock comprised of 100% matrix content with zero porosity (FIG. 4, 41), or a fluid comprised of 100% of hydrocarbon for instance (43), is assumed to yield infinity resistivity resulting in a zero resistivity ratio value. On the other hand at water pole (42) the resistivity of water (Rw) theoretically becomes equal to the total resistivity (Rt) resulting in resistivity ratio value of 1.

The two properties obtained from the well log data are chosen also so that the collection of pairs of values of acquired parameters (namely the acoustic impedance on the one hand and the resistivity ratio function on the other) at least partly correspond to the equal fluid saturation volume ($S_{fl}$) for sedimentary rocks comprising a given proportion of matrix or water are substantially identical.

This selection of petrophysical parameters substantially simplifies the operation for estimating the fluid saturation. In a cross-plot of the two chosen properties, the collection of pairs of values of the said parameters are spread over iso-fluid-saturation curves. A diagram may be drawn where the iso-saturation curved lines converge at the 100% matrix pole (41). A reference curved line (44) representing 0% (or 0 fraction) $S_{fl}$ which joins the 100% (or 1 fraction) water pole (42) with the 100% (or 1 fraction) matrix pole (41).

The baseline (45) represented by the X-axis against the resistivity ratio function ($\sqrt{R_w/R_t}$)=0 was assumed to be having infinity resistivity and zero porosity. If we assume the rock consists of matrix, target fluid (Oil/gas, or CO2 for instance) and water-filled matrix porosity then collection of pairs of values of the parameters serving as reference which is represented by the iso-saturation curved line equivalent to a given fluid percentage within a rock obtained experimentally from values of the two chosen parameters acquired from the data.

This method of determining the $R_w$ to align the 0% (or 0 fraction) $S_{fl}$ zone data along the 0% (or 0 fraction) fluid reference line implies that, among the zones crossed by the well, some are water-bearing. This is possible if we assume the data pairs with lowest resistivity ratio function values occasionally showing a trend partly parallel to the 0% (or 0 fraction) $S_{fl}$ reference line (44). It is possible to verify the existence of such zones by comparison with other fluid saturation calculation techniques within a basin. The pairs of values are represented by the set of iso-saturation curved lines, from the line with 0% fluid saturation to the line representing 100% fluid saturation volume within the rock pores. The fluid saturation which corresponds to that is then obtained by applying the following relation:

$$\sqrt{\frac{R_w}{R_t}} = \frac{\left(\rho_{ma} - \frac{AI}{V_{Pma}}\right)(1 - S_{fl})}{\sqrt{a}\left[AI\left\{S_{fl}\left(\frac{1}{V_{Pfl}} - \frac{1}{V_{Pw}}\right) + \left(\frac{1}{V_{Pw}} - \frac{1}{V_{Pma}}\right)\right\} - \{S_{fl}(\rho_{fl} - \rho_w) + (\rho_w - \rho_{ma})\}\right]} \quad (1)$$

where $V_{Pma}$, $V_{Pfl}$ and $V_{Pw}$ are the P-wave velocities of the mineral matrix, target fluid and water respectively, $\mu_{ma}$ is density of mineral grains, $\rho_{fl}$ is density of target fluid, $\rho_w$ is density of water, $R_t$ is deep resistivity, $R_w$ is the resistivity of water, 'a' is tortuosity factor, AI is acoustic impedance and $S_{fl}$ is the target fluid saturation (in fraction). The tortuosity factor 'a' controls the slope of the iso-saturation curved lines and may be selected in a formation zone depending on pore structure, grain size and level of compaction. The relevant constants may be taken from Mavko et al (2009) and vendors' logging chart books.

Figure 4:
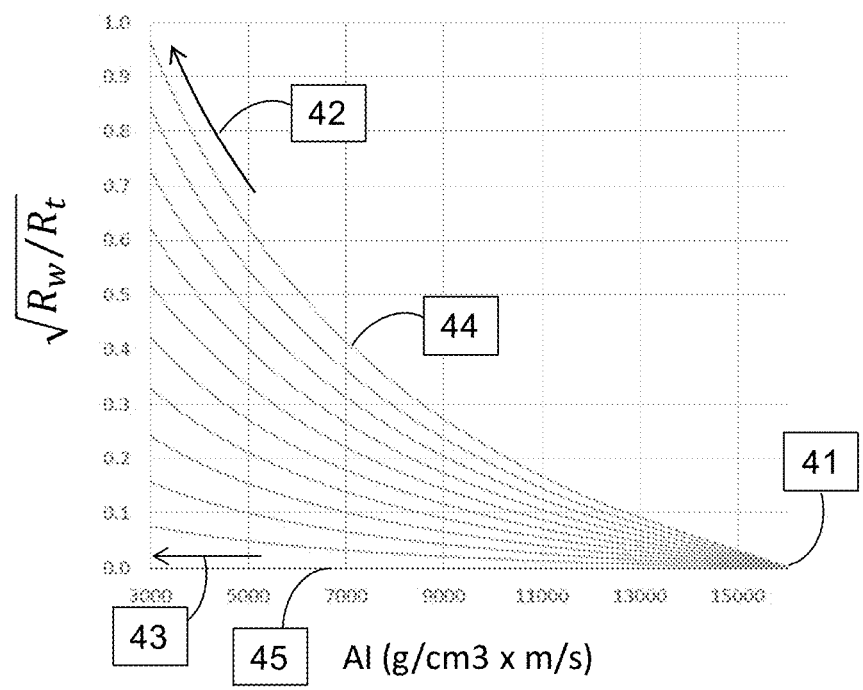
FIG. 4 shows a set of iso-saturation of target fluid curved lines in a three-pole diagram onto AI-Resistivity ratio plane.
Figure 10:
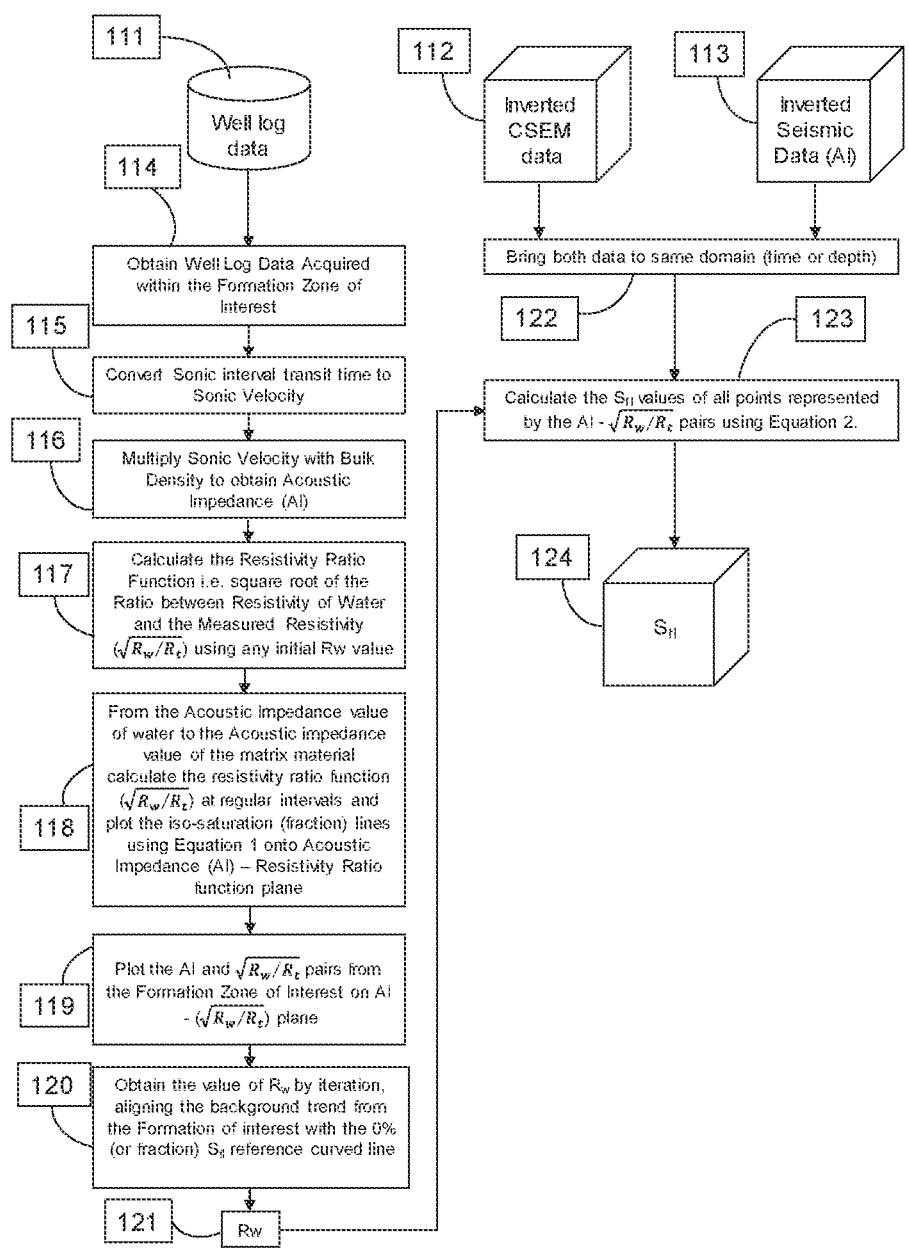
FIG. 10 is a flowchart showing elementary steps in one embodiment of the present inventive method.

From this function (equation 1) we are able to define a set of lines representing different fluid saturations converging at the 100% matrix pole onto the Acoustic impedance-resistivity ratio function plane (FIGS. 4 & FIG. 10, step 118).

Rearranging the equation the fluid saturation can be calculated in fraction (that can be converted to a percentage by multiplying with 100) using the following equation:

$$S_{fl} = \frac{\left[\rho_{ma} - AI\left(\frac{1}{V_{Pma}}\right)\right] + \sqrt{\frac{aR_w}{R_t}}\left\{(\rho_w - \rho_{ma}) - AI\left(\frac{1}{V_{Pw}} - \frac{1}{V_{Pma}}\right)\right\}}{\left[\sqrt{\frac{aR_w}{R_t}}\left\{AI\left(\frac{1}{V_{Pfl}} - \frac{1}{V_{Pw}}\right) - (\rho_{fl} - \rho_w)\right\} + \left\{\rho_{ma} - AI\left(\frac{1}{V_{Pma}}\right)\right\}\right]} \quad (2)$$

Figures 5A, 5B:
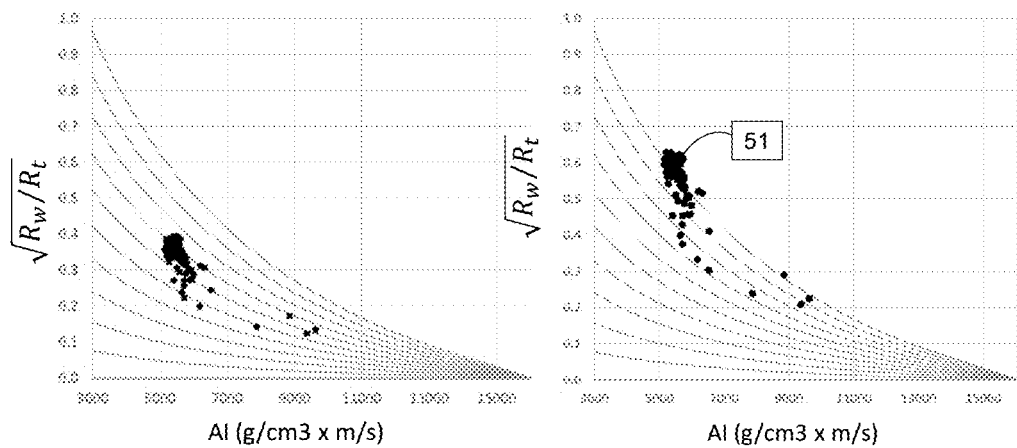
FIG. 5 A-B illustrates the plotting of the set of pairs on the same diagram of values of the parameters acquired in a well by three well-logging probes before the $R_w$ calibration (A), and after $R_w$ calibration (B)

Until now the Rw is unknown, iterate the value of $R_w$ making the upper right part of the data representing the 100% water-saturated matrix (51 in FIG. 5B) to align with the 0% (or 0 fraction) fluid saturation line. The obtained $R_w$ value (FIG. 10, 121) is employed to insert in the step (123).

Figure 8:
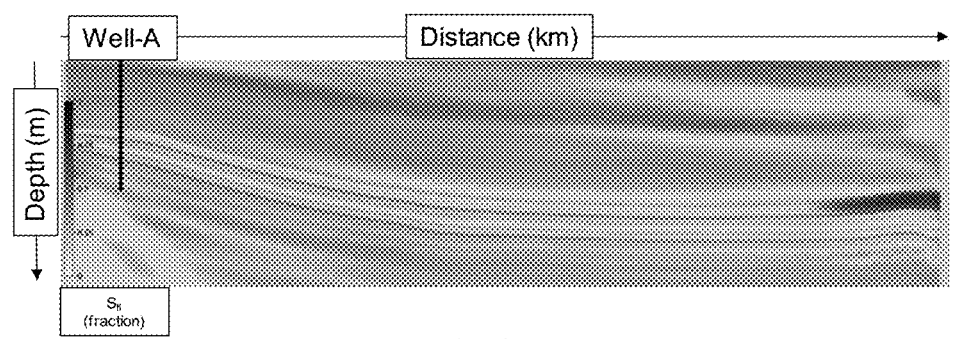
FIG. 8 is the output obtained after using equation 2 showing the $S_{fl}$.
Figure 9:
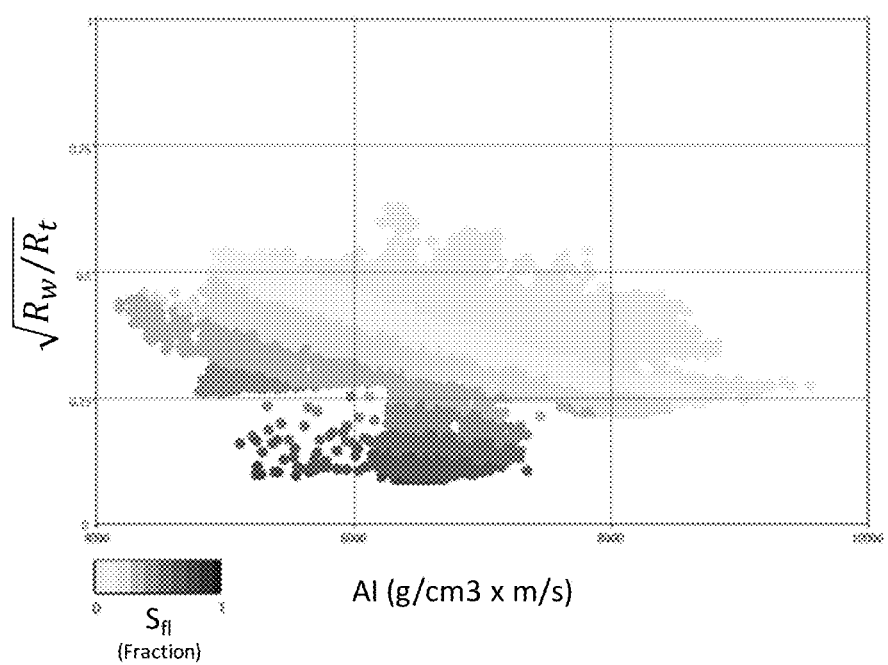
FIG. 9 shows the resistivity ratio function computed from CSEM resistivity plotted against the AI obtained from the inverted seismic. The fluid saturation ($S_{fl}$) calculated using the present method of invention is represented by grey shade. The darker the grey color, higher is the target fluid saturation.

Bring the inverted CSEM data (FIGS. 6 & FIG. 10, step 112) and inverted seismic data in the form of AI (FIGS. 7 & FIG. 10, step 113) to the same domain (122); time or depth. Putting both the inverted CSEM and AI with the $R_w$ in equation 2 and calculate (123) to obtain the fluid saturation ($S_{fl}$)(124). The obtained $S_{fl}$ profile in this embodiment is shown in FIG. 8, and the computed points from selected data plotted onto an AI vs ($\sqrt{R_w/R_t}$) plane are illustrated in FIG. 9.

The technical solution is only one embodiment of the present invention, to those skilled in the art, the present invention discloses a fundamental principle of the method and applications, straightforward to make various types of modifications or variations, the method is not limited to the specific embodiments of the present invention described above, and therefore the manner described above are only preferred and is not in a limiting sense.

References Cited
PATENT DOCUMENTS

| | | | |
|---|---|---|---|
| US | US8064287B2 | November 2011 | Peter Harris, Lucy Macgregor |
| W | O2014000758A1 | January 2014 | Torgeir Wilk, Per Atle Olsen, Lars Ole Løseth |
| US | 20090306899A1 | December 2009 | Peter Harris, Joel Walls |
| US | 20080059075A1 | March 2008 | Daniele Colombo, Michele De Stefano |
| US | 20090204327A1 | August 2009 | Xinyou Lu, James J. Carazzone |

-continued

References Cited
PATENT DOCUMENTS

| | | | |
|---|---|---|---|
| US | 20140058677A1 | February 2014 | Leendert Combee |
| WO | 2012173718A1 | December 2012 | Christopher DiCaprio, Jan Schmedes, Charlie Jing, Garrett M. Leahy, Anoop A. Mullur, Rebecca L. Saltzer |

OTHER PUBLICATIONS

Archie, G. E. (1942): "The electrical resistivity log as an aid in determining some reservoir characteristics", Trans. AIME, 146, 01, 54-62.

Carcione, J. M., B. Ursin & J. I. Nordskag (2007): "Cross-property relations between electrical conductivity and the seismic velocity of rocks", Geophysics, 72, 5, E193-E204.

Mavko, G., T. Mukerji & J. Dvorkin (2009): The rock physics handbook: Tools for seismic analysis of porous media, Cambridge university press.

What is claimed is:

1. A method for estimation of fluid saturation $S_{fl}$ in a subsurface reservoir using at least three well-logging probes lowered into at least one well nearest to the subsurface reservoir (111), the method comprising:
  a) obtaining pairs of sonic velocities and bulk density values from well log data (114), wherein the sonic velocities are obtained from sonic interval transit times (115), wherein the pairs of sonic velocities and bulk density values are obtained for various depths of the at least one well, wherein the sonic velocities are obtained using a first well-logging probe of the at least three well-logging probes, and the bulk density values are obtained using a second well-logging probe of the at least three well-logging probes,
  b) obtaining a series of acoustic impedances (116) for the at least one well by calculating a product for each respective pair of sonic velocity and bulk density value, thereby obtaining a series of sonic velocity-bulk density value products with each product corresponding to an acoustic impedance, wherein the series of acoustic impedances develop in a same direction in response to a volumetric change of water or target fluid in sedimentary rocks,
  c) obtaining a resistivity ratio function (117) for the at least one well by measuring a series of resistivity values from a third well-logging probe of the at least three well-logging probes, the resistivity ratio function being defined as square roots of ratios between a first value for resistivity of water and each measured resistivity value of the series of resistivity values, wherein the first value for resistivity of water is an arbitrarily chosen initial value, and wherein the resistivity ratio function develops in different directions in response to the volumetric change of water versus target fluid,
  d) obtaining resulting pairs, wherein the resulting pairs define an acoustic impedance-resistivity ratio plane (118) such that the resulting pairs within the acoustic impedance-resistivity ratio plane correspond to an equal fluid saturation, the equal fluid saturation associated respectively with the sedimentary rocks, wherein the sedimentary rocks comprising a given percentage of rock matrix or water are equally represented by one pair of values of parameters of 100% fluid saturation, creating a system of sets of pairs of values of the parameters, to obtain a continuous representation of the fluid saturation of a formation of interest penetrated by the at least one well (119),
  e) estimating resistivity background within the formation of interest (120), and simultaneously obtaining a second value for resistivity of water (121),
  f) obtaining inverted controlled-source electromagnetic (CSEM) survey data (112) from the formation of interest,
  g) bringing the inverted CSEM survey data and acoustic impedances inverted from seismic data (113) into a same domain (122), the same domain being depth or time,
  h) estimating the fluid saturation $S_{fl}$ (124) using an equation (123) by inputting the acoustic impedances inverted from the seismic data (113), the inverted CSEM survey data (112), and the second resistivity of water (121) whereby $S_{fl}=1-S_w$, where, $S_w$ is water saturation.

2. The method of claim 1, wherein the well log data measured using the at least three well-logging probes includes electric resistivity of the formation of interest penetrated by the at least one well, transit time of sound through ground, and density of the ground.

3. The method of claim 2, wherein the well log data measured using the at least three well-logging probes comprises the electric resistivity of the formation of interest, the transit time of the sound through the ground, and the density of the ground, wherein a representation diagram is chosen as a function of the resistivity ratio function and of the series of acoustic impedances, wherein each pair of values of the system of sets of pairs of values of the parameters is associated with a same fluid saturation and a set of parallel iso-fluid saturation curves, wherein the fluid saturation associated with each pair of values of the series of acoustic impedances and of the resistivity ratio function is determined by identifying a saturation curve passing through a point representative of the pair of values in the chosen representation diagram.

4. The method of claim 2, wherein a slope of iso-volumetric content curves is controlled by a tortuosity factor 'a' that is selected for the formation of interest considering pore structure, grain size and level of compaction.

5. The method of claim 2, wherein the second value of resistivity of water is determined by iterating the first value of resistivity of water while aligning a 100% water-saturated borehole data onto the acoustic impedance-resistivity ratio plane with a 0% fluid saturation reference curved line.

6. The method of claim 1, wherein a reference set is established by selecting, from all the pairs of values acquired from the inverted CSEM data and the acoustic impedances inverted from the seismic data, at least one specific pair of quantities for which a given fluid saturation in fraction or equivalent percentage may be associated.

7. The method of claim 1, wherein quantities from each pair of values acquired in the inverted CSEM data and the acoustic impedances inverted from the seismic data are demonstrated in a diagram as a function of coordinates, wherein a first coordinate represents the series of acoustic impedances and a second coordinate represents the resistivity ratio function as a square root of the ratio between the first value of resistivity of water and a resistivity of rock, wherein a collection of pairs of values equivalent to a corresponding content are manifested by a system of curved lines parallel to a reference curved line representing a zero fluid saturation in fraction or equivalent percentage, to which a given fluid saturation may be allocated, wherein a position of the given fluid saturation is ascertained by at least two representative points, one representative point being associated with a rock containing only the rock matrix and the given fluid saturation, and a second representative point being associated with a pair of values acquired by input data being associated with the given fluid saturation.

8. The method of claim 7, wherein positions of iso-fluid saturation curved lines are determined between an axis with 100% rock matrix member on one end and the 100% fluid saturation on another end, both ends represented by values taken by corresponding parameters.

9. The method of claim 1, wherein the set of pairs of values typical of the target fluid and of the rock matrix are obtained from existing literature.

10. The method of claim 1, wherein when using an organic-rich shale data with increasing values of the fluid saturation may indicate increase in maturation.

* * * * *